(12) United States Patent
Ein

(10) Patent No.: US 9,969,251 B2
(45) Date of Patent: May 15, 2018

(54) SECURING APPARATUS FOR COVER

(71) Applicant: ADCO PRODUCTS, INC., Valencia, CA (US)

(72) Inventor: Morgan Ein, Valencia, CA (US)

(*) Notice: Subject to any disclaimer, the term of this patent is extended or adjusted under 35 U.S.C. 154(b) by 180 days.

(21) Appl. No.: 14/798,351

(22) Filed: Jul. 13, 2015

(65) Prior Publication Data
US 2016/0009167 A1 Jan. 14, 2016

Related U.S. Application Data

(60) Provisional application No. 62/023,358, filed on Jul. 11, 2014.

(51) Int. Cl.
*B60J 11/04* (2006.01)

(52) U.S. Cl.
CPC .................................. *B60J 11/04* (2013.01)

(58) Field of Classification Search
CPC .. B60J 11/00; B60J 11/06; B60J 11/02; B60R 1/06; B64F 1/005
USPC ...... 150/166, 168; 135/115, 88.01; 114/361; 296/136.02, 136.07, 136.08, 136.11, 296/136.13, 95.1; D12/401, 403
See application file for complete search history.

(56) References Cited

U.S. PATENT DOCUMENTS

| | | | | |
|---|---|---|---|---|
| 4,938,522 A * | 7/1990 | Herron | ..................... | B60J 11/00 150/166 |
| 5,228,408 A * | 7/1993 | Jannausch | ............... | B63B 17/02 114/361 |
| 5,915,399 A * | 6/1999 | Yang | ........................ | B60J 11/00 135/119 |
| 6,070,629 A * | 6/2000 | Whiteside | ................ | B60J 11/00 150/166 |
| 9,156,339 B1* | 10/2015 | Perez | ....................... | B60J 11/04 |
| 9,365,099 B1* | 6/2016 | Ehrhart | ..................... | B60J 11/00 |
| 9,533,557 B2* | 1/2017 | Staudt | ...................... | B60J 11/04 |
| 2005/0139300 A1* | 6/2005 | Harmon | .................. | B60J 11/00 150/166 |
| 2007/0284023 A1* | 12/2007 | Sitarz | ....................... | B60J 11/00 150/166 |

* cited by examiner

*Primary Examiner* — Fenn C Mathew
*Assistant Examiner* — Cynthia Collado (57) ABSTRACT

An exemplary adjustable and flexible recreational or large vehicle cover may have one or more first securing systems and one or more second securing system, and any combination thereof. The first and second securing systems may be used to dynamically change the size and/or configuration of the cover to correspond more closely with an underlying RV or covered object.

13 Claims, 8 Drawing Sheets

SECURING APPARATUS FOR COVER

PRIORITY

This application claims priority to U.S. Application No. 62/023,358, filed Jul. 11, 2014, which is incorporated by reference in its entirety into this application.

BACKGROUND

Recreational vehicles have become more popular as families and retirees look to travel by road, while maintaining the comforts of home. Recreational vehicles (RVs) vary greatly with respect to their size, from being the size of a van all the way up to being the size of a large bus. Travelers also have the option of buying a recreational vehicle or renting one, depending on the travel needs at the time. While many variations of recreational vehicles are manufactured, Class "A" and "Bus" style recreational vehicles are defined as those having a large truck chassis and are distinguishable by the accessibility of the driving area from the living space or vehicle interior while standing. Other recreational vehicles are those that are pulled or towed behind a car or truck.

There are times of the day (or night) where the travelers need to cover recreational vehicle. In some instances, travelers may want to cover the RV at a stop or campground in order to keep sunshine out and the interior of the vehicle cool or to keep the RV clean and protected. At other times of the day, travelers cover the RV to keep outsiders from being able to look inside of the interior of the vehicle, such as at night or when they are away from the RV. Finally, travelers who own their recreational vehicles need to protect the RV when the vehicle is not in use or is in storage.

Conventionally, there are very few options for an owner or operator to securely cover an RV or different types of RVs with a secure, adjustable cover that is easy to use, simple to adjust and will not damage the paint or finish of the RV.

SUMMARY

Exemplary embodiments may include an adjustable and flexible recreational or large vehicle cover that: a) can be used on a number of different types and sizes of recreational vehicles, b) can be adjusted so that it will not leave gaps between the cover and the RV, c) can be easily cleaned, d) does not require drilling of snaps or twist grommets into the body of the vehicle, e) can roll up or fold up in order to be easily stored in a small space, such as under a seat, in a glove compartment or another small space, f) can be used in all climate and wind conditions to protect the RV, and g) combinations thereof.

Exemplary embodiment may include an exemplary adjustable and flexible recreational or large vehicle cover having a first securing system, a second securing system, an access system, a venting system, a reinforcing system, other features, and any combination thereof. The first and second securing systems may be used to dynamically change the size and/or configuration of the cover to correspond more closely with an underlying RV or covered object.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include one or more securing devices for positioning and securing a cover to an object. The securing device may, for example, include a casing, in which a cord is threaded through tunnel created in the cover and secured. The cord may have a variable length, such as through a buckle, synch, elastic, pull cord, etc. so the securing device may pull or tighten the cover around the desired object. Other securing devices may be used in addition or alternatively thereto. For example, other securing devices may include belts, elastic material, as described herein or as known.

Although embodiments of the invention may be described and illustrated herein in terms of covers for class A recreational vehicles, it should be understood that embodiments of this invention are not so limited, but are additionally applicable to other covering or securing applications. For example, other coverings may include those for other long term, outdoor storage, such as motorcycles, cars, all-terrain vehicles, boats, trailers, hauler, vans, trucks, campers, recreational vehicles, etc. Furthermore, although embodiments of the invention may be described and illustrated herein in terms one or more securing apparatus, it should be understood that embodiments of the invention include any combination of features described herein. Any combination of disclosed features is considered within the scope of the present invention and should be considered as if laid out individually in any combination, sub-combination, and recombination, including duplicating, subtracting, integrating, and subdividing features and components. It is understood that no single feature is necessary to the practice of the present invention.

Figure 1:
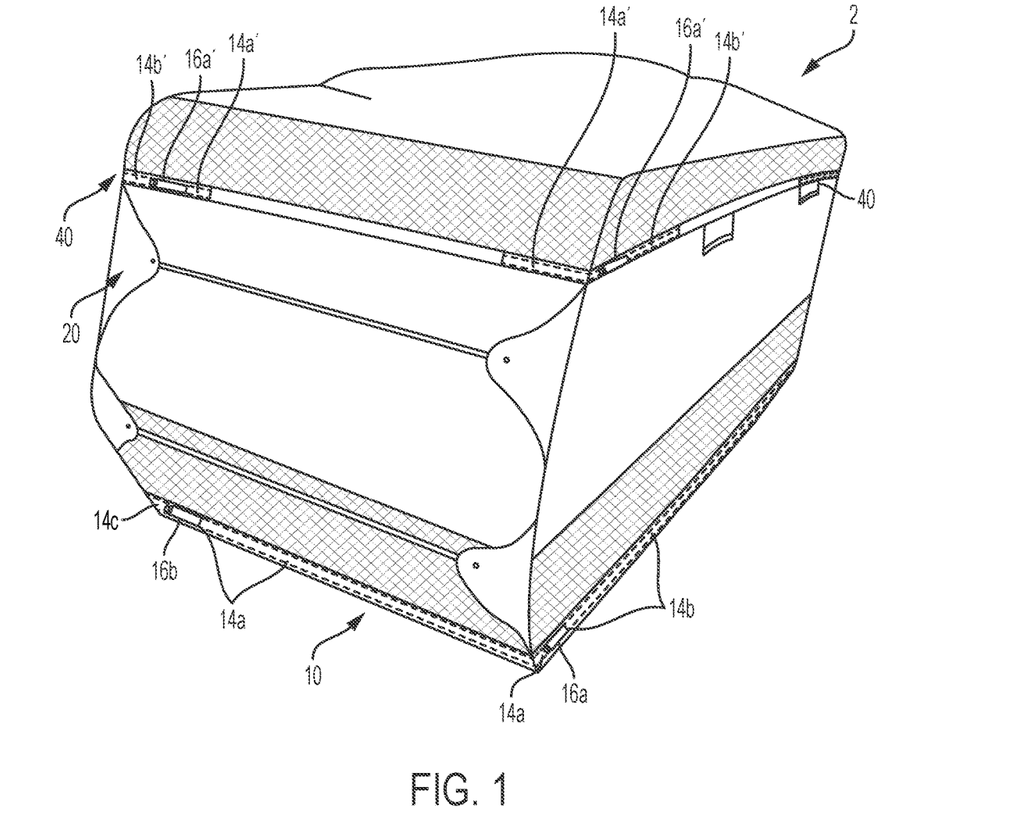
FIG. 1 illustrates a rear perspective view of an exemplary embodiment of a cover comprising a securing apparatus.
Figure 2:
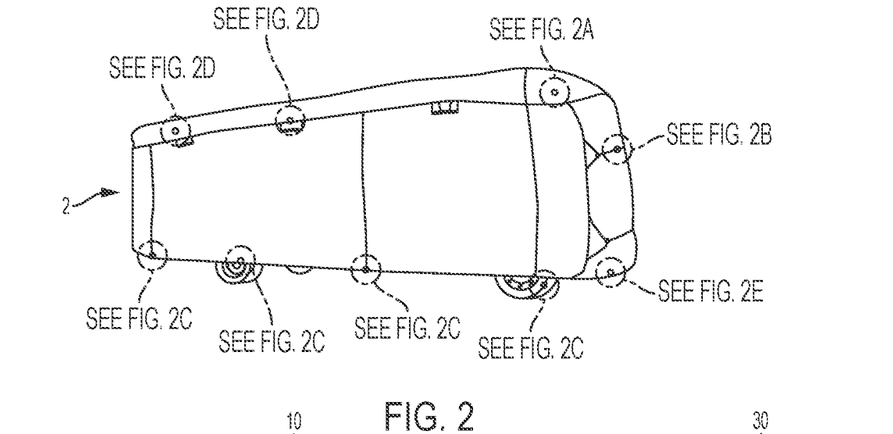
FIG. 2 illustrates a front perspective view of an exemplary embodiment of the cover including exploded views of select locations of the exemplary cover.
Figure 2A:
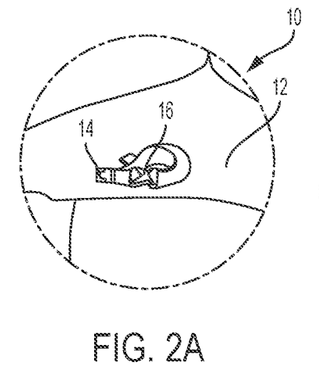
FIGS. 2A-2E provide expanded views of the select features of FIG. 2.
Figure 2B:
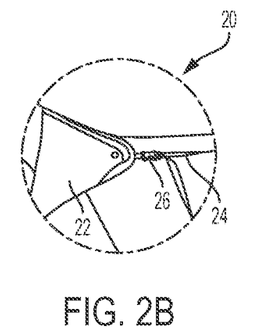

FIG. 1 illustrates a rear perspective view of an exemplary embodiment of a cover comprising a securing apparatus. FIG. 2 illustrates a front perspective view of an exemplary embodiment of the cover including exploded views of select locations of the exemplary cover. FIGS. 2A-2E provide expanded views of the select features of FIG. 2. Exemplary embodiment may include a first securing system, 10, a second securing system 20, an access system 30, a venting system 40, a reinforcing system 50, and any combination thereof. Exemplary embodiments of the RV cover 2 may include one or more first securing apparatus 10.

As shown, two first securing systems 10 are used to circumscribe the cover around top and bottom portions of the cover. The first securing system 10 may be positioned anywhere around the cover, and may include one or more systems. For example, a first securing system may be used along a top edge or portion, a bottom edge or portion, a middle portion, and combinations thereof. The first securing system 10 is configured to bring the cover at the securing system to the RV surface, such that, at least locally around the securing system, the perimeter defined by the cover and the perimeter defined by the exterior of the RV at the securing system are substantially similar. Substantially similar is understood to mean that the cover generally follow approximately the same contours and similar sizes such that the cover may be brought into contact with the RV at one or more locations and then approximate the contour of the RV between the points of contact.

The RV cover 2 may include one, two, or more first securing systems 10. The exemplary first securing system 10 includes a retaining feature 12, a securing device 14 and a locking device 16. The retaining feature 12 is any feature to couple the securing device to the RV cover. The securing device 14 permits the securement of the cover to the RV. The locking device 16 opens, closes, and/or adjusts the securing device 14. As show, the retaining feature 12 is a casing, the securing device 14 is a cord, and the locking device 16 is a buckle.

In the illustrated exemplary embodiment, the casing circumscribes the cover on the lateral edges of the cover and is integrated with the cover. The casing permits the generally unimpeded translation of a cord 14 through the casing. The casing restricts substantial displacement of the cord in a direction perpendicular to the intended translation direction of the cord. Therefore, the casing generally defines a tunnel around a perimeter of the cover on the lateral sides of the cover. The casing 12 may fully or partially circumscribe the cover. The cord is a non-elastic belt. The buckle includes mated interlocking sides that engage and disengage. The buckle and chord are configured to permit a variable perimeter of the first securing system or variable working length of the cord. The cord is enclosed by the casing. The casing comprises openings such that the buckle is exposed and the securing device may be opened, closed, or adjusted. The casing and/or buckle (or any retaining feature/securing device/locking device combination) may be configured such that the buckle is accessible by a user and does not become inaccessible or covered by the retaining feature. For example, the buckle may generally have a width larger than a width of the casing such that the opposing terminal ends of the cord extend beyond the casing and are always accessible by a user as long as the buckle is secured to the cord. The cord may also be selectively directly attached to the cover at one or more points, such that the cord does not translate or otherwise move relative to the cover, locally, at the one or more attachment points.

A casing is illustrated in the exemplary embodiment to show a retaining feature to couple the cord to the RV cover. Other retaining features may be used, including buttons, snaps, loops, slits (such that the cord is threaded on interior and exterior portions of the cover), etc. The retaining feature may permit the free or variable translational position of the cord around a perimeter of the cover, such that the same portion of the cord can be positioned over different portions of the cover around a lateral perimeter of the cover. In this way, extra material of the cover may be brought in at the perimeter and the cover maintained near the surface of the RV.

The retaining feature, alternatively or in addition to the casing described above, may include a direct attachment of the securing device 14 to the cover. For example, the securing device may be attached to the cover by adhesive, bonding, sewing, or other permanent or semi-permanent attachment. The attachment may be used to prevent relative movement between the securing feature and the cover in one, more, or all directions. For example, the retaining feature may be used to keep the securing feature within a desired orientation or relative location to the cover so the securing feature is not separated or lost from the cover.

A cord is used to describe the securing device of the first securing system. The cord is intended to encompass any flexible material having a length longer than its width. For example, cord may include string, thread, thong, lace, ribbon, strap, tape, tie, line, rope, cable, wire, tube, or other single or multiple component/twisted and untwisted configurations. The cord 14 may fully or partially circumscribe the cover.

In an exemplary embodiment, the securing device may comprise one or more separate pieces. For example, for the cord configuration described above, a plurality of cords may be used to fully or partially circumscribe the cover and/or RV. One or more locking devices may be used to couple and manipulate the attachment between adjacent chords defining sections of the securing device. Referring to FIG. 1, for example, two to five separate cords may be used along one or more lateral edges. As seen in the perspective view, a first cord 14a is positioned along a majority (more than 50%) or a substantial (more than 80%) portion of one lateral side of the cover, and a second cord 14b is positioned along a majority or a substantial portion of an adjacent lateral side of the cover. A locking device 16a is used between adjacent cords to couple and manipulate the cords relative to each other. A second locking device 16a is used between the next adjacent pair of cords (14a and cord 14c).

The plurality of securing device sections and plurality of locking devices may be configured to fully circumscribe the cover. In this configuration, when the locking devices join adjacent sections of securing device, the RV is fully enclosed or encircled by the securing system. The plurality of locking devices and/or sections of securing device may permit the cover to be adjusted locally, or targeted about select portions of the cover. For example, if each section of locking device is attached to the cover at a single location so that relative movement is not permitted (such as by sewing, bonding, or adhering the securing device to the cover) or substantially limited (such as by a tether between the securing device and the cover) at the attachment point, manipulation of the locking device may control contraction or expansion of the cover between two adjacent attachment points. Therefore, the cover under or between the sections of securing device coupled by the manipulated locking device may be selectively controlled.

In an exemplary embodiment, a second securing system comprises a plurality of securing device sections aligned along a second perimeter of the cover and fully circumscribing the perimeter of the cover. Each securing device section may be attached to the cover such that the cover and securing device section do not translate relative to each other at the attachment point. Adjacent securing device sections may then be coupled to each other through a locking device. The locking device and/or securing device sections are configured such that the working length between adjacent attachment points along the perimeter may be altered. The securing device sections may be enclosed in a retaining feature, such as a continuous channel along the length of the cover perimeter. The channel may include openings to permit access to the locking device between securing device sections. In an exemplary embodiment, two, three, four, and/or five securing device sections are used with two to five locking devices between adjacent sections with an access opening for each locking device. An exemplary embodiment two to three such securing device sections may be used to fully circumscribe the cover along the perimeter around a lower region of the cover.

The plurality of securing device sections and plurality of locking devices may be configured to only partially circumscribe the cover. In this configuration, a first terminal end of a section of securing device may be attached to the cover so that relative movement is not permitted or is substantially limited. For example, the first terminal end of a first cord 14*a*' may be attached to the cover by sewing, bonding, adhering or other permanent or semi-permanent attachment. A first terminal end of a second cord 14*b*' may be similarly attached to the cover. The attachment locations of the first and second cords may be separated circumferentially around the perimeter. In an exemplary embodiment, the attached terminal ends of the first and second cords are to adjacent lateral sides of the cover and may be proximally located about the same lateral edge of the cover. A proximate location may be, for example, within half or a quarter of the length of the total length of the lateral edge to which it is attached. The opposing terminal ends of the first cord 14*a*' and second cord 14*b*' come together and are coupled through locking device 16*a*'. In an exemplary embodiment, the first and second securing device sides may be one continuous device, and the locking device is configured to vary an attachment point along a length of the two sides, such as with a pull cord. A plurality of sectioned securing devices may be aligned around the perimeter of the cover, and intermittently positioned about the perimeter. For example, a section of the secure device may traverse around the circumferential perimeter along a length traversing the lateral edges and extending along a portion of adjacent lateral sides of the cover, i.e. around a corner of the cover. The sections of securing device may or may not be fully or partially covered or retained by retaining feature 12.

In an exemplary embodiment, a first securing system comprises a plurality of securing device sections aligned along a perimeter of the cover and intermittently positioned about the perimeter such that gaps are formed along the perimeter between securing device sections. Each section includes a first securing device side and a second securing device side. Each securing device side is permanently or semi-preeminently attached to the cover at one end region thereof and come together and selectively attach to each other at an opposing end or region thereof. The coupling may be through a locking device. The coupling may permit the working length of the securing device section to vary, such that the length of the cover perimeter between attachment points of the first and second securing device sides is variable. The attachment points of the first and second securing device sides may be on adjacent lateral sides of the cover such that the coupled securing device section traverses an edge of the cover. An exemplary embodiment may include four such securing device sections positioned around the perimeter at each corner of the cover positioned around a top region of the cover. A retaining feature may be used, such as a channel formed in the cover to enclose the securing device side from the attachment end along a length.

The usable length of the cord may be variable such that the cover perimeter at the casing may be dynamically altered to accommodate various RV shapes and sizes. For example, the cord 14, itself, may have a variable length. The cord may be elastic such that it can be stretched by the RV to deform and conform to the RV shape. The locking device in this case may be the coupling of opposing ends of the cord such as by bonding, adhesion, tying, integrated/continuous segments, or cord stop. The first securing system 10 may create the variable usable length by, for example, using a locking device, such as a latch, buckle, ratchet, cord stop, buttons, snap, prong, detent, etc. In this case, the cord may or may not be elastic. In an exemplary embodiment, the cover may include one side of a locking device, while the cord includes the mated side to the retaining feature. Alternatively, or in addition thereto, opposing ends of the cord may include mated sides of the locking device. The cover and/or cord may include one or more locking device sides such that a variable length may be achieved by selecting different ones of a plurality of available locking device sides along a portion of the cover or cord. Exemplary mated locking device sides include, for example, button/hole, prong/receptor, detent/indent, male/female snap, etc. The possible perimeters of the illustrated buckle/cord system is continuous, but different securing device and locking device combinations may be used to permit discrete or non-continuous selection of select perimeters.

Exemplary first securing system 10 may be used to secure the cover circumferentially around the lateral perimeter of the RV. The first securing system 10 may be used to remove slack from the cover material or around the perimeter of the RV to reduce billowing of the cover. The first securing system 10 may be used to reduce the relative motion or contact between the RV and the cover so that contact wear from rubbing is reduced. The first securing system 10 may also be used to secure the cover to the RV by reducing the size of the cover around the RV such that the cover more closely contours to or matches the exterior profile of the RV.

In an exemplary embodiment, the first securing system 10 may anchor the cover to the RV such that it cannot be removed while the first securing system is engaged. For example, the first securing system 10 may be used to ensure the bottom of the cover circumscribes the bottom perimeter of the RV. The first securing system 10 may be used to reduce a perimeter of the bottom of the RV cover such that the bottom opening of the cover perimeter is less than the exterior perimeter of the RV. Therefore, when secured, the RV cannot pass through the bottom opening of the cover, and the cover is maintained on the RV.

The RV cover 2 may include one, two, or more second securing systems 20. The exemplary second securing system 20 includes a retaining feature 22, a securing device 24 and a locking device 26. The retaining feature 22 is any feature to couple the securing device 24 to the RV cover 2. The securing device 24 permits the securement of the cover to the RV. The locking device 26 opens, closes, and/or adjusts the securing device 24. As show, the retaining feature 22 is an integrated extension of the cover or flap of material extending from the cover, the securing device 24 is a cord, and the locking device 26 is a buckle.

The retaining device 22 is coupled along a first end of the retaining device to the cover lateral side. As shown, the retaining device 22 is a material sheet that attaches to the cover along a first end and to the securing device 24 at a second opposite end. The retaining device 22 is coupled to the cover 2 at the first end by sewing, but other connections are possible, such as bonding, adhesive, rivets, buttons, snaps, zipper, buckle, etc. The retaining device 22 is coupled to the securing device 24 by a rivet, but other connections are possible, such a sewing, bonding, adhesive, buttons, snaps, zipper, buckle, opening, etc.

The retaining device 22 tapers from the first end to the second end such that the height at the second end is less than a height at the first end. As shown, two retaining devices are aligned vertically on a lateral edge or side of the cover and corresponding two retaining devices are aligned vertically on the same or another lateral edge or side of the cover. The total height of the one or more aligned retaining device first ends (along which one or more retaining devices couple to the lateral side of the cover) may be at least a half of a height of the lateral side of the cover. Therefore, more of cover is controlled by the manipulation of the second securing system working length. Therefore, the cover lateral side modified by the second securing system more closely relates or conforms to corresponding lateral side of the RV.

In the illustrated exemplary embodiment, the retaining device 22 permits a lateral edge of the cover to be brought towards an adjacent lateral edge of the cover, and retain the securing device to the cover. A lateral edge may occur at a cover vertical seam or may be any vertical position of a lateral side. Any retaining device 22 may be used, such as direct or indirect attachment, including, sewing, adhesive, bonding, riveting, buckling, etc.

A cord is used to describe the securing device of the second securing system. The cord is intended to encompass any flexible material having a length longer than its width. For example, a cord may include string, thread, thong, lace, ribbon, strap, tape, tie, line, rope, cable, wire, tube, or other single or multiple component/twisted and untwisted configurations. The cord 24 may or may not be elastic.

Similar to the securing device/locking device described with respect to the first securement system, the usable length of the second securement system may also be variable such that the width of a lateral side of the cover incorporating the second securement device may be dynamically altered to accommodate various RV shapes and sizes. For example, the cord 24, itself, may have a variable length. The cord may be elastic such that it can be stretched by the RV to deform and conform to the RV shape. The first securing system 20 may create the variable usable length by, for example, using a locking device, such as a latch, buckle, ratchet, cord stop, buttons, snap, prong, detent, etc. In this case, the cord may or may not be elastic. In an exemplary embodiment, the cover may include one side of a locking device, while the cord includes the mated side to the retaining feature. Alternatively, or in addition thereto, opposing ends of the cord may include mated sides of the locking device.

Figure 3:
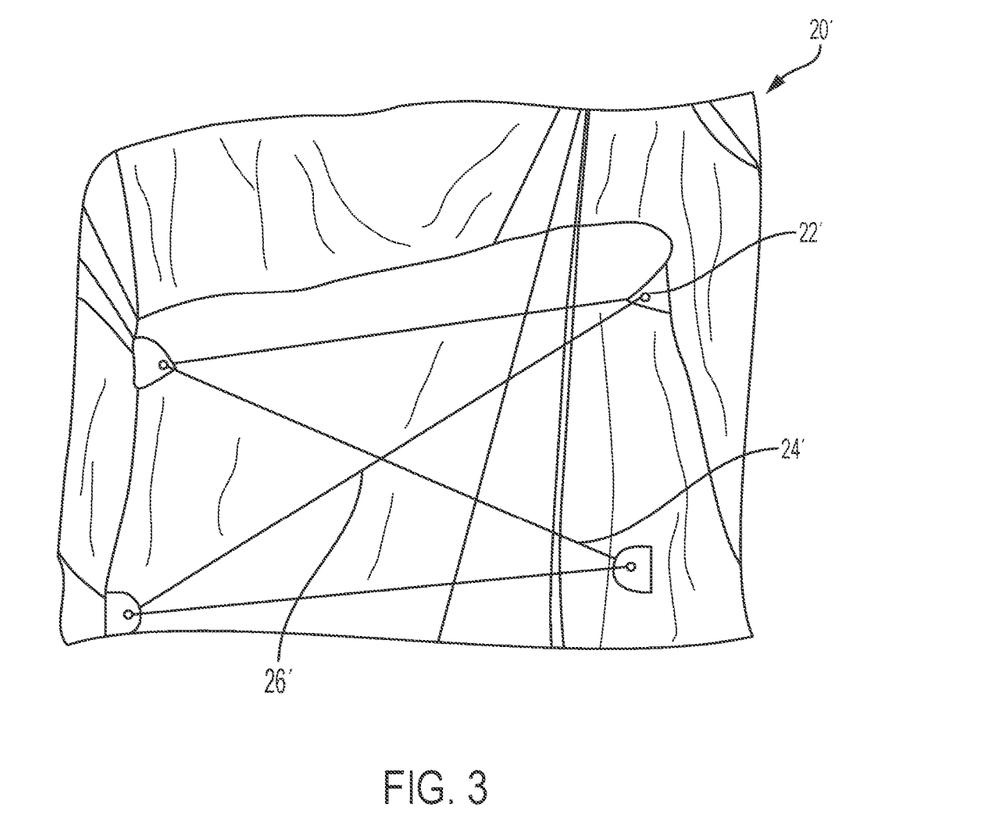
FIG. 3 illustrates an exemplary alternate embodiment of a securing apparatus.

FIG. 3 illustrates an exemplary alternate embodiment of a second securement system 20' including an exemplary retaining feature 22', a securing device 24', and a locking device 26'. As shown, the retaining feature 22' is similar to the retaining feature 22 of FIG. 2, but smaller. In this case, the retaining feature is sown or otherwise attached to a lateral edge of the cover. The retaining feature 22' forms a tab or projection to which the securing device 24' is coupled to the cover. The retaining feature 22' includes an aperture. The securing device 24' is a cord that threads through multiple retaining features. The opposing ends of the securing device are attached so the securing device 24' creates a continuous loop. As shown, there are two pairs of retaining features 22' so the securing device forms a FIG. 8 when threaded through each retaining feature. The locking device 26' may be a direct attachment of the ends of the securing device 24'. In this case, the securing device 24' is elastic and contours the end of the cover to the RV. The locking device 26' may also include other devices that permit a static or variable length of the securing device 24', similar to other locking devices described herein.

Exemplary second securing system 20 may be used to secure the cover to the RV. The second securing system 20 may locally remove slack from the cover at one or more sides or panels of the cover. The second securing system 20 may also be used to reduce the size of the cover along an edge or panel such that the cover more closely contours or resembles the exterior profile of the RV.

It is noted that the retaining feature, securing device, and locking device as described with respect to either the first or second securing systems, and any embodiment thereof, may be used interchangeably in any combination, such that features described with respect to each system may be substituted, added, deleted, integrated, or divided within the other and remain within the scope of the invention.

The cover may include one or more other features to improve fit, protection, durability and other benefits of the cover. Any combination of features may be incorporated into the cover as desired by the user.

Figure 2C:
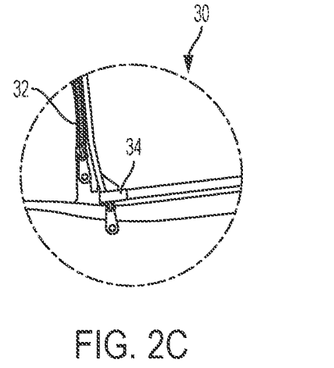
Figure 4:
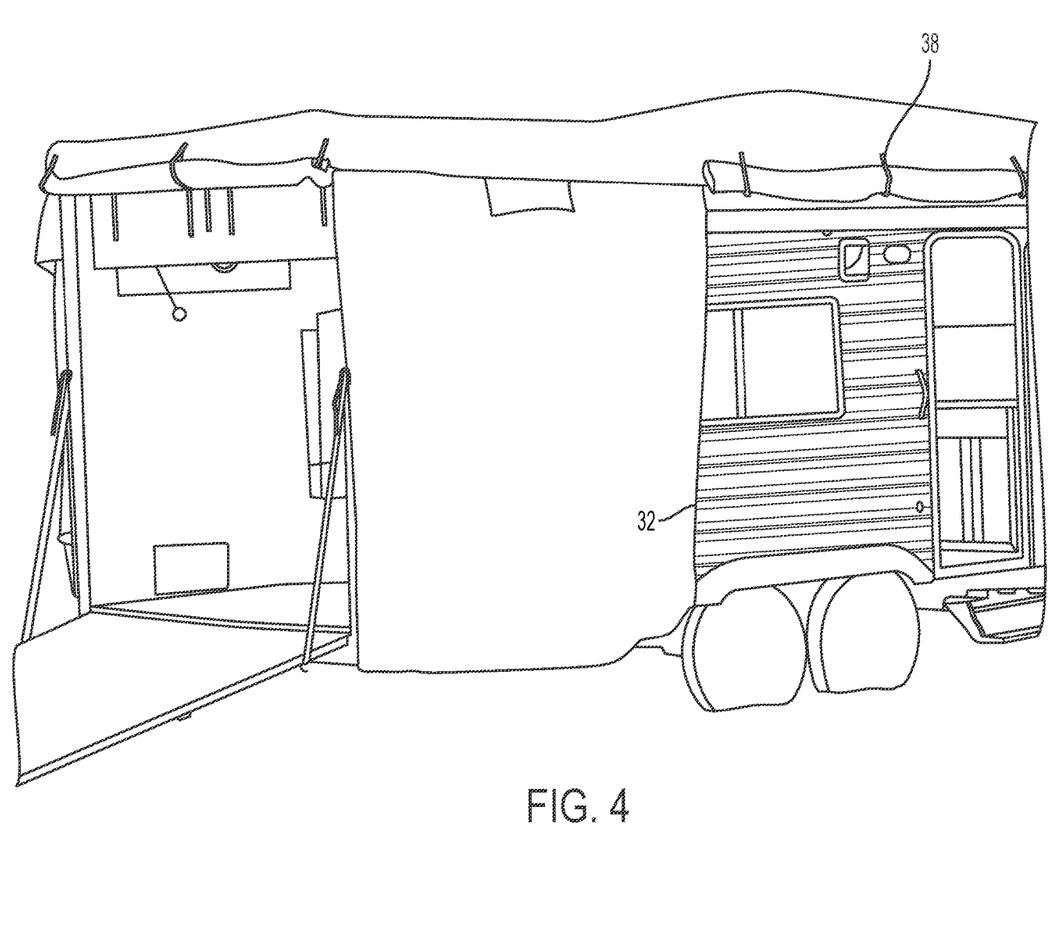
FIG. 4 illustrates an exemplary access system.

As seen in FIG. 2C and FIG. 4, one or more portions of the cover may include an access system 30 such that access to one or more portions of the RV may be obtained while the cover is in use. As show, the cover 2 may include separable panels 34. The separable panels 34 may be fully or partially removable. The panels may include zippers or other removable/reattachable coupling interface 32. Other coupling interfaces 32 may include, for example, buttons, snaps, hook/loop, hook/latch, loop/t-latch, buckles, etc. The coupling interface 32 may be included on two vertical sides of the panel and/or on a top horizontal side, such that the panel may be fully or partially separated from the rest of the cover. The coupling interfaces may be continuous or discontinuous. In an exemplary embodiment, the edges may be separated independently of each other. The cover may also include a storage system for the panels, such as retaining feature 38. As shown, retaining feature 38 includes straps that retain the removable panel in a compressed configuration for out of the way storage and unimpeded access to the RV. Other retaining features 38 may also be used, for example, belts/buckles, straps, elastic loops, hook/loop strips, hook/loop, etc.

Figure 2D:
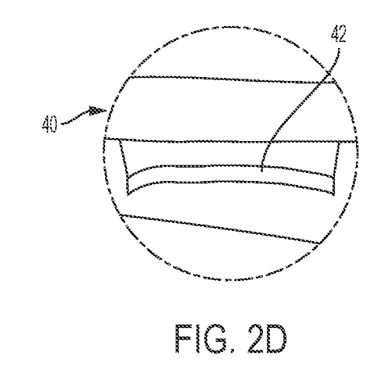

As shown in FIG. 2D, the cover 2 may also include a venting system 40. The vents may be used to permit circulation, or prevent billowing as the cover is installed or used. The vent may include a flap 42 or other partial cover so that the vent still protects the underlying surface. The vent system may include an opening in the cover to permit air flow. The vent system may also include one or more layers of material fully or partially covering the opening, to prevent particulates from entering the covered area. The one or more layers may be breathable and/or permit passage of air, moisture, or a combination thereof depending on the needs of the cover. The vent system may include either the same or different layer combination as the rest of the cover, while still providing a continuous layer of protection across the entire cover.

Figure 2E:
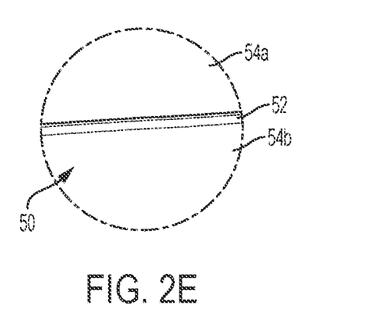

As shown in FIG. 2E, the cover may include a reinforcing system 50 to provide extra protection or strength at high wear portions of the cover. The reinforcing system 50 may include features to provide additional protection against certain conditions, such as ultraviolet (UV) light, water, dirt, wind, debris, and combinations thereof. For example a different, more durable material, extra material layers, different material compositions or coatings, or reinforced seams may be positioned across local areas of the cover. Areas of reinforcement may include corners, seams, corners, edges, perimeters, surfaces, or a combination thereof. In the exemplary embodiment shown, the corners and lower edges include a reinforced material and/or reinforced seams. The top portion may include UV protection and/or water resistance.

Similar to the reinforcing system, areas of the cover may be modified to provide other localized benefits. In an exemplary embodiment, the cover may include elastic or stretchable corners and/or areas such as at or around the corners, edges, seams, and combinations thereof. Locally expandable sections of the cover may permit the cover to better contour to and/or protect the RV.

Figure 5A:
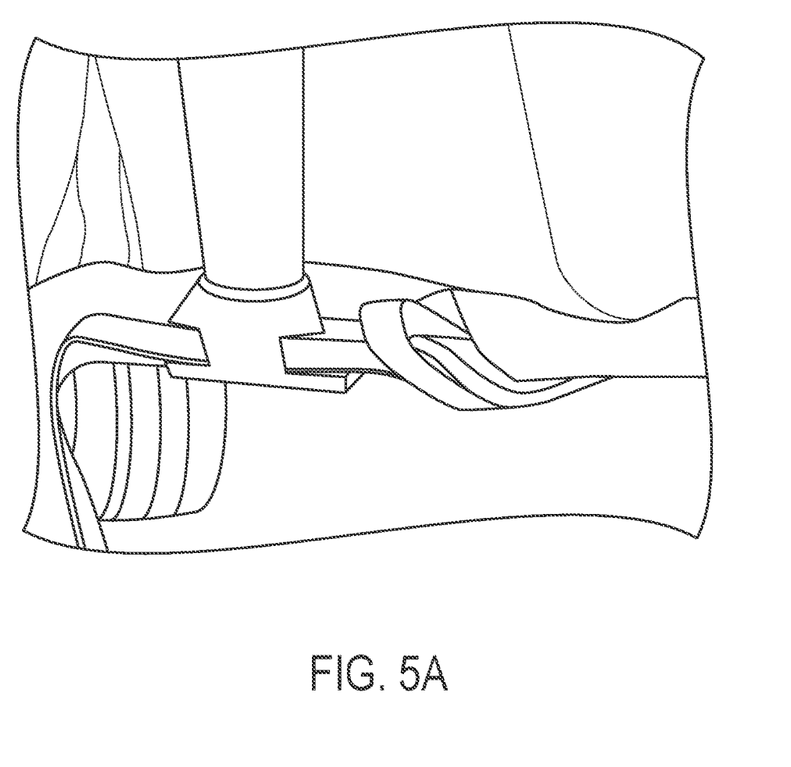
FIG. 5A-5B illustrates an exemplary feature of an exemplary securing apparatus.
Figure 5B:
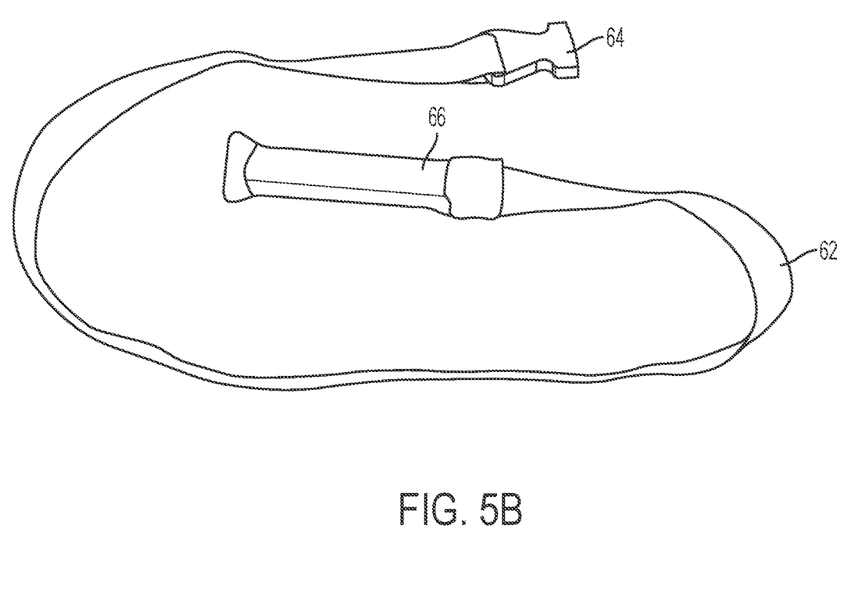

As seen in FIGS. 5A-5B, the RV cover may be used with weighted securing devices 14, 24, 24', etc. Exemplary embodiments include weights 66 incorporated into a securing device 62 and/or locking device 64. As shown, a weight is integrated with and coupled to a strap. The weighted securing device may be used to retain the cover and or portions of the cover in a desired configuration. For example, the weighted securing device may be used around the lower perimeter or portion of the cover to keep the cover weighted to the ground and prevent it from blowing or billowing in response to air or wind currents. Exemplary weighted components may also be incorporated into other features of the cover, such as the cover itself or other removable with respect to panels, securing devices, or other feature or component described herein.

Figure 6:
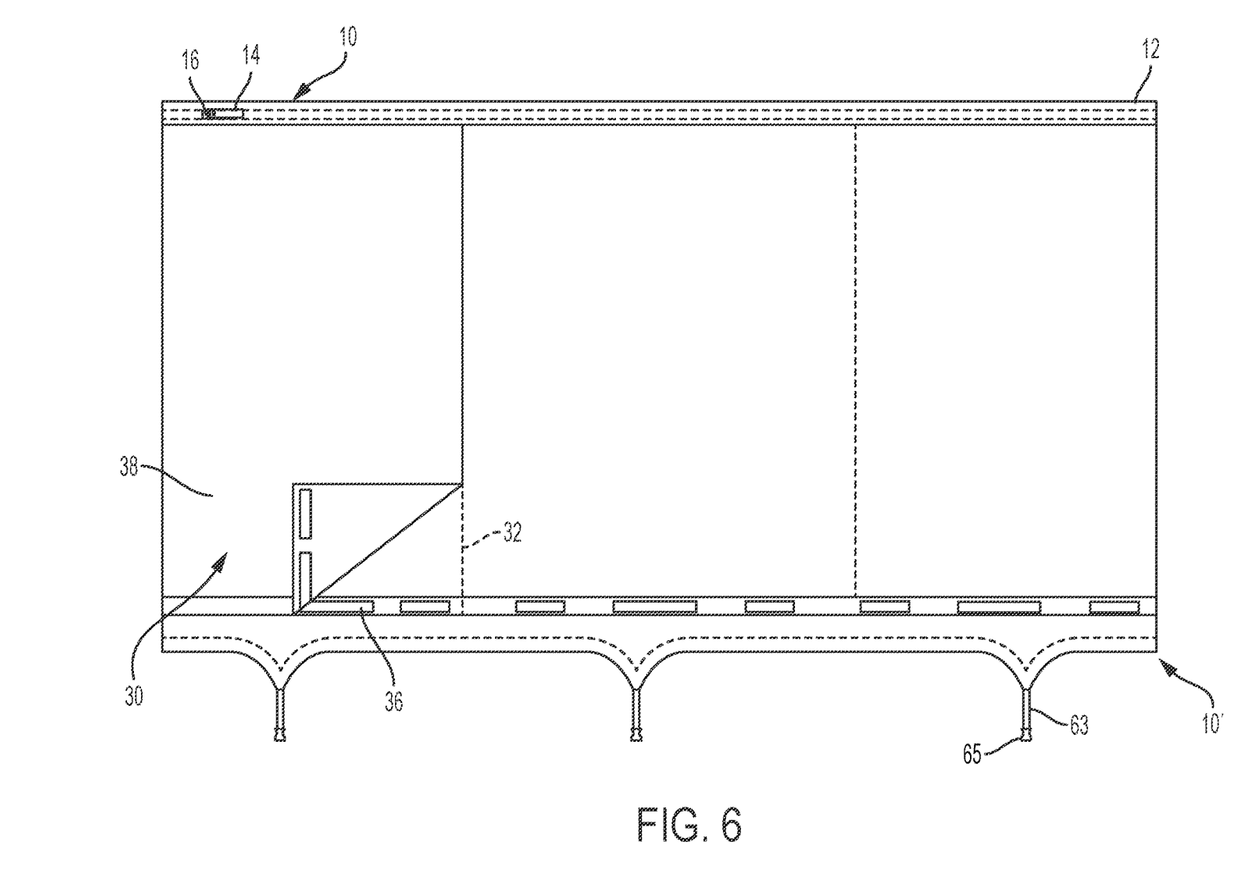
FIG. 6 illustrates an exemplary size portion of a cover according to embodiments described herein.

FIG. 6 illustrates a lateral side portion of an exemplary cover incorporating exemplary combination of features described herein. As shown, the cover includes an exemplary first securing system, 10 and access system 30. The first securing system may be as described herein and may be positioned circumferentially around a top and bottom portion or edge of the cover. Therefore, the first securing system may run horizontally along a top and bottom of the lateral side of the cover. The first securing system 10 may include a retaining feature 12, a securing device 14, a locking device 16, and combinations thereof, as described herein. As shown, the bottom first securing system 10' may be positioned to either extend under the RV or be used with the weighted securing device of FIG. 5B. As shown, the first securing system 10' may circumferentially extend around the lower perimeter of the cover. The first securing system may include extensions 63 that may coupled through a locking device 65 to the securing system extensions of an opposing lateral side of the cover. The extensions 63 may also couple to weighted securing system, as shown in FIG. 5B that is configured to be weighted to the ground. Alternatively, the weighted securing device of FIG. 5B may be used to position the extension 63 in a desired location. For example, during use the extension 63 may be coupled to the weighted securing system of FIG. 5B. The weighted end 66 may be thrown or positioned under, over, or around the RV and maintained until the user can move to the desired position. The user can then uncouple the extension 63 from the weighted securing system and couple the extension to an extension of an opposing lateral side to secure the cover full around the RV. The cover of FIG. 6 also includes an access system 30 including removable panel 38 coupled to the cover through zipper 32 and Velcro® 36 sections. The lateral side may include a plurality of panels to provide selected access to one or more portions of the covered RV. For example, a width of a panel may correspond to a window, pop-out, door, or other feature of the RV such that the panel can be released or removed and selective access obtained.

Figure 7:
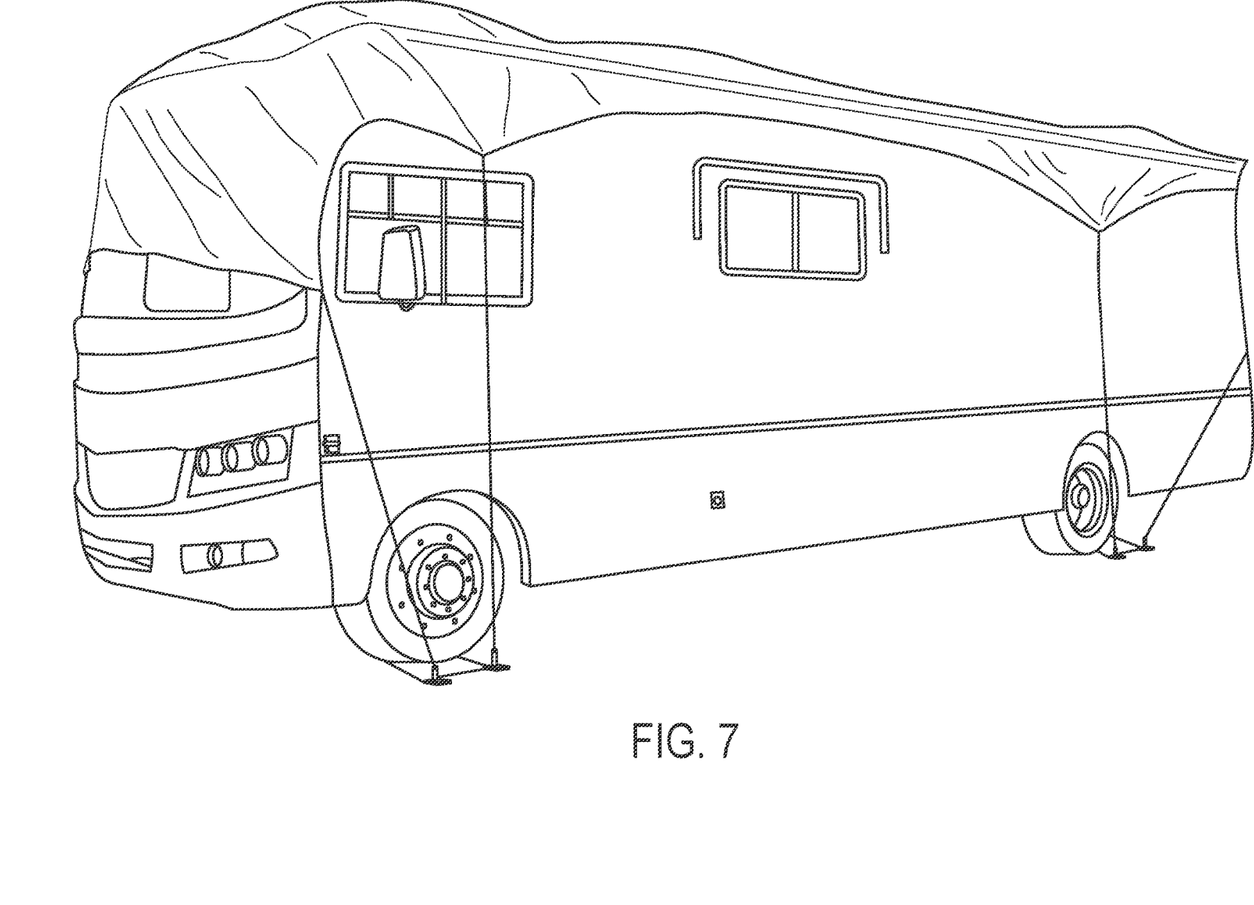
FIG. 7 illustrates an exemplary embodiment of the securing device integrated into a roof cover according to embodiments described herein.

FIG. 7 illustrates an exemplary embodiment of the securing device integrated into a roof cover as opposed to a fully enclosed cover for use with an RV. In this case, instead of the securing system circumscribing a perimeter of the cover around each lateral side, the securing device runs along all or a portion of just one lateral side of the cover. A plurality of securing systems may be used on opposing lateral sides of the cover instead of on different portions, such as top and bottom portions, of the same side. The securing device and locking device may be integrated into the coupling system of the RV cover.

An adjustable and flexible recreational or large vehicle and/or towed trailer cover has been developed that incorporates the securing apparatus and is described herein that: a) can be used on a number of different types and sizes of recreational vehicles, b) can be adjusted so that it may not leave gaps between the cover and the RV, c) can be easily cleaned, d) may not require drilling of snaps or twist grommets into the body of the vehicle, e) can roll up or fold up in order to be easily stored in a small space, such as under a seat, in a glove compartment or another small space, f) can be used in different climate and wind conditions to protect the RV, and f) combinations thereof.

FIGS. 1-7 show a contemplated recreational vehicle cover with several exemplary and novel components. First, the cover may fit snugly and securely on the RV. Second, the cover may incorporate the contemplated securing apparatus that is designed to allow the user/operator to tighten the cover on the body of the vehicle. For example, at the top and bottom of lateral sides of the cover, webbing may be woven into a pocketed area that is sewn into the edges of the cover. The webbing system may be designed to be pulled taught or cinched in order to secure the cover on to the RV. The webbing system may also be elastic such that it self imposes the reduced configuration. In additional embodiments, there are extra reinforcements throughout the top and bottom of the cover, in order to keep it as a long-term and viable protective cover for the RV or trailer. The cover may include panels that are Velcro lines, zippered, or otherwise attachable/removable, wherein the panels can be opened up or removed, so that the user/operator can access the RV or trailer without taking the cover off of the trailer.

In contemplated embodiments, one or more of the straps, the webbing and/or the cords disclosed herein may comprise a natural material, a synthetic material or a combination thereof. Contemplated natural materials comprise any suitable material for this application and may include cotton, hemp, wool, leather, suede or a combination thereof. Contemplated synthetic materials comprise any suitable material for this application, including nylon, spandex, lycra or a combination thereof.

Suitable structure for the one or more straps, webbing portions and/or cords includes a webbing design, a woven design, a solid design or a combination thereof. Exemplary objectives of the straps, webbing portions and/or cords may include: a) flexible, b) durable, c) easy to store and d) non-abrasive—in that the straps, webbing portions and/or cords should not damage the paint or finish significantly.

Thus, specific embodiments of an exemplary adjustable and flexible recreational or large vehicle cover, including securing apparatus are provided herein. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A cover having a top portion and a first lateral side portion adjacent a second lateral side portion adjacent a third lateral side portion adjacent a fourth lateral side portion, the first, second, third, and fourth lateral side portions extending from the top portion, and a first securing system, the first securing system comprising:
    a securing device extending along at least a portion of a perimeter of the cover, the perimeter circumscribing the first, second, third, and fourth lateral side portions;
    a retaining device to couple the securing device to the cover; and
    a locking device, wherein the securing device, locking device, and combinations thereof are configured to dynamically change a length of the perimeter of the cover,
    wherein the securing device comprises two or more cords and the retaining device comprises a channel formed in the cover through which the securing device is threaded, and
    wherein a first cord is attached to the cover at a first attachment point on the cover such that relative motion between the first cord and the first attachment point is limited and a second cord is attached to the cover at a second attachment point on the cover such that relative motion between the second cord and the second attachment point is limited, and the locking device couples the first cord to the second cord.

2. The cover of claim 1, wherein a combination of the securing device and locking device fully circumscribe the perimeter.

3. The cover of claim 1, wherein the securing device comprises three cords and the locking device comprises three locking apparatus, one of the three locking apparatus positioned and coupling adjacent two of the three cords, the retaining device comprising three openings to permit access to the three locking apparatus.

4. The cover of claim 1, wherein the first attachment point is on one lateral side of the cover and the second attachment point is on an adjacent lateral side of the cover.

5. The cover of claim 4, wherein the first attachment point couples a terminal end of the first cord to the cover and the second attachment point couples a second terminal end of the second cord to the cover.

6. The cover of claim 1, wherein the locking device is positioned between one or more sections of the securing device.

7. The cover of claim 1, wherein the securing device comprises four pairs of cords, wherein each pair of cords has a terminal end of one of the pair of cords coupled to one of a lateral side of the cover and the other of the pair of cords has a terminal end coupled to an adjacent one of a lateral side of the cover, wherein the locking device comprises four locking devices positioned between and coupling each pair of cords.

8. The cover of claim 7, wherein the locking device comprises a buckle or cord lock.

9. The cover of claim 7, wherein each pairs of cords is separated along the perimeter from an adjacent pair of cords such that portions of the perimeter are not enclosed by the securing device.

10. A cover having a top portion and a first lateral side portion adjacent a second lateral side portion adjacent a third lateral side portion adjacent a fourth lateral side portion, the first, second, third, and fourth lateral side portions extending from the top portion, and a first securing system and a second securing system,
    the first securing system comprising:
    at least two first cords fully circumscribing and extending along a first perimeter of the cover, the first perimeter circumscribing the first, second, third, and fourth lateral side portions, and
    a first retaining device to couple the at least two first cords to the cover, and
    a first locking device coupling the at least two first cords to each other, wherein the at least two first cords, the first locking device, and combinations thereof are configured to dynamically change a length of the first perimeter of the cover; and
    the second securing system comprising:
    at least two pairs of second cords extending along a second perimeter of the cover, the at least two pairs of second cords extending along only a portion of the second perimeter such that a gap is formed between the two pairs of second cords, the second perimeter circumscribing the first, second, third, and fourth lateral side portions, and
    a second retaining device to couple the at least pairs of second cords to the cover, and
    at least two second locking devices, each second locking devices coupling individual cords of the pairs of second cords to each other, wherein the pairs of second cords, the second locking device, and combinations thereof are configured to dynamically change a length of the second perimeter of the cover.

11. The cover of claim 10, wherein the first and second retaining devices are channels formed in the cover.

12. The cover of claim 10, wherein the first securing system circumscribes a lower portion of the cover and the second securing system partially circumscribes an upper portion of the cover.

13. The cover of claim 10, wherein each of the at least two first cords and each of the at least two pairs of second cords are directly coupled to the cover separate from the first and second retaining device.

* * * * *